United States Patent [19]

Foxcroft et al.

[11] Patent Number: 4,821,670

[45] Date of Patent: Apr. 18, 1989

[54] WHISTLE

[75] Inventors: Ronald L. Foxcroft, Burlington; Charles G. Shepherd, Oakville, both of Canada

[73] Assignee: Fortron Inc., Hamilton, Canada

[21] Appl. No.: 82,708

[22] Filed: Aug. 7, 1987

[51] Int. Cl.[4] .............................................. G01K 5/00

[52] U.S. Cl. ................................ 116/137 R; 446/205; 446/206; 446/204; 84/330

[58] Field of Search ........ 116/18, 22 A, 24, DIG. 18, 116/DIG. 19, DIG. 25, 137 R, 137 A, 138, 139, 140, 145, 70, 112, 141, 146; 340/323 R, 406, 404; 446/26, 19, 204, 205, 206, 178, 213, 202, 207, 216; 84/384, 1.18, 1.01, 1.16, 1.24, 330

[56] References Cited

U.S. PATENT DOCUMENTS

| | | | |
|---|---|---|---|
| D. 263,383 | 3/1982 | Moore | D10/119 |
| D. 279,461 | 7/1985 | Lafreniere | D10/119 |
| 632,184 | 8/1899 | Johnson | 446/206 |
| 696,814 | 4/1902 | Hatch | 446/206 |
| 1,814,730 | 7/1931 | Myers | 84/330 |
| 1,852,934 | 4/1932 | Michalski | 446/206 |
| 2,052,926 | 9/1936 | Frisk | 84/330 |
| 2,113,396 | 4/1938 | Butterfield | 116/137 R X |
| 2,777,251 | 1/1957 | Bailey | 446/205 |
| 4,207,703 | 6/1980 | Saso | 446/205 |
| 4,709,651 | 12/1987 | Lance | 116/137 R |

FOREIGN PATENT DOCUMENTS

| | | | |
|---|---|---|---|
| 116329 | 1/1943 | Australia | 446/204 |
| 553 | of 1909 | United Kingdom | 446/204 |
| 20 | of 1915 | United Kingdom | 446/204 |

*Primary Examiner*—William M. Shoop, Jr.
*Assistant Examiner*—Paul Ip
*Attorney, Agent, or Firm*—Rogers & Scott

[57] ABSTRACT

The invention provides a new whistle, intended for sports referees, and for small boat emergency use, where a loud piercing sound is required without the possibility of loss of sound by "over-blowing" or by sticking of the freely-moving ball used in conventional whistles. The profile of the new whistle preferably is of flat-topped "mandolin" shape in side elevation, so that it is familiar and readily acceptable by established users, and yet includes three separate fipple-type whistle elements in a single whistle body, each with its own air column chamber and vibration-producing knife edge, at least two of which chambers are of slightly different lengths, so as to produce complex harmonics and beats that increase the piercing quality and audibility of the sound. This is done by providing two elements side-by-side and parallel to one another, with the third also parallel and below (or above in an inverted shape) the other two protruding into the space between them. The body is provided with a rearwardly-protruding boss into which the third column extends, so that its knife edge can be set back from the others to retain the desired side profile, and yet it can be the longest of the three. The whistle is made as a three-part moulding, two of which fit within the third, the moulding parts providing different parts of the three element chambers, their knife edges, air-directing passages and the boss, so that all three parts can be moulded without the use of complex moulds and the whistle is complete when the three are assembled together.

36 Claims, 3 Drawing Sheets

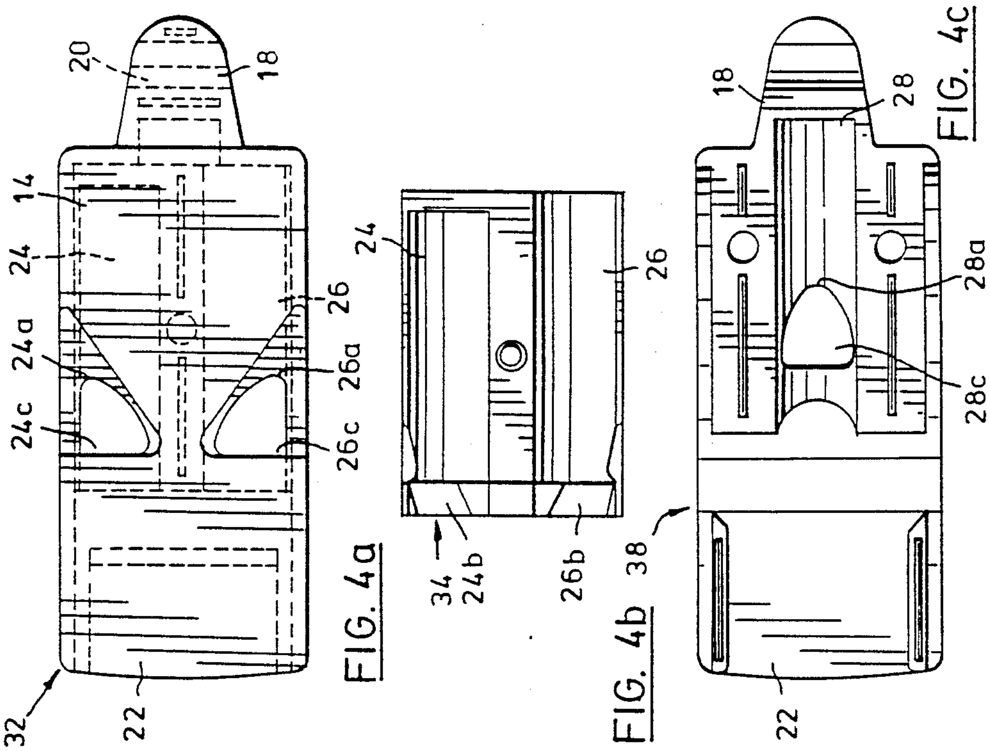
FIG. 4a
FIG. 4b
FIG. 4c
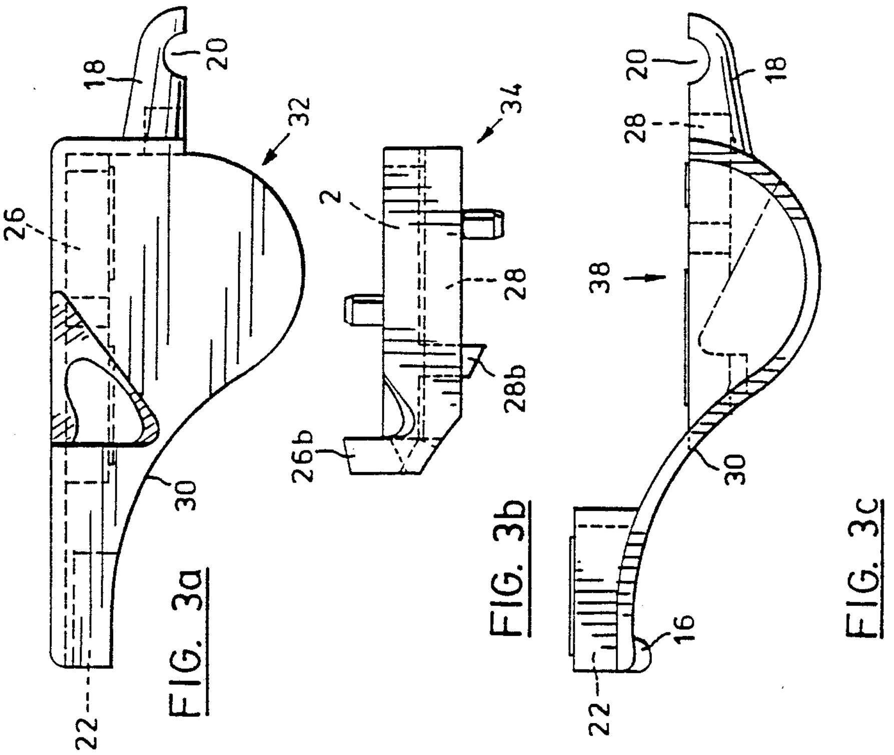
FIG. 3a
FIG. 3b
FIG. 3c 14
16
18
20
24
24a
24b
24c
26
26a
26b
26c
28a
28b
28c
32
34
38

WHISTLE

FIELD OF THE INVENTION

This invention is concerned with improvements in or relating to whistles, and especially but not exclusively to such whistles intended for use by sports' referees

REVIEW OF THE PRIOR ART

Whistles are of course fundamental equipment for referees in most sports and must readily produce a sound that is clearly audible at least to the players, and preferably also the spectators, despite the high background noise that is present in many sports arenas, particularly indoor arenas. With the increasing commercialization of sports the matter of good audibility becomes very important, since failure to hear even a single whistle signal can have a profound effect on the outcome of a game, and consequent acrimonious argument between players, management, spectators, sportscasters, etc. as to what the result should have been. It is therefore one of the nightmares of a referee that his whistle fails to sound, so that his signal is not heard at the crucial point of a game, and of course this tension increases with the importance of the game and the size of the audience viewing it.

It is now a requirement for all boats of whatever size that they carry a device that will produce a clearly audible distress signal, and a loud piercing whistle is the preferred equipment for smaller boats such as canoes, sailboards and dinghies. The standard referee and distress whistle as currently used is a compact version of a "fipple flute", in which the sound is produced by directing a stream of air against a sharp edge, sometimes called a "splitter", thus causing the air to vibrate in an air column of predetermined length behind the edge. The volume of the sound produced, and its piercing quality, are increased by imparting an additional vibrato effect to the air column, usually by means of a small freely-moving ball trapped in the air column enclosure. This type of whistle generally has been quite satisfactory, but does have some problems, especially since under modern conditions the background noise can be quite high, particularly with indoor sports such as basketball and volleyball. It is a fundamental problem of the fipple-type instrument that if it is blown too hard it "over-blows" and makes less noise rather than more, and such over-blowing can easily happen during the course of an exciting game or exciting episode during a game, so that the referee must constantly be on guard against this eventuality. Again, it is inevitable that saliva from the user's mouth enters the air column and coats the walls and the ball, and this can become sufficient to make the ball stick to the enclosure wall, so that it is ineffective and the volume of sound is drastically reduced to below the level of audibility; this can happen quite suddenly without prior warning.

It is already known to provide a fipple-type instrument consisting of an assembly of a number of separate whistles having air columns of different lengths, and therefore of different fundamental frequencies, all of which are blown simultaneously from a single mouthpiece in order to produce a more audible sound with greater volume, but such instruments are generally bulky and awkward to hold, particularly in the mouth. This is a considerable disadvantage for referees, who are the major users of these instruments, since they must feel comfortable in their handling and use over the often long period of a game, during the majority of which the whistle in held in the mouth.

DEFINITION OF THE INVENTION

It is therefore an object of the invention to provide a new whistle of fipple-type of a preferred shape having particularly good volume and audibility.

It is another object to provide such a whistle that is operable without the use of a vibrato-producing ball.

In accordance with the present invention there is provided a whistle of the type comprising at least three fipple-type whistle elements in a single whistle body, each whistle element having a chamber providing a respective vibratable air column and a respective vibration-producing edge at its entrance, at least two of the air columns being of different lengths, the whistle comprising:

first and second whistle elements disposed side-by-side as seen in plan with the third whistle element disposed between the other two elements, the third whistle element being displaced laterally from the first and second elements as seen in side elevation for reasons of compactness; and a common mouthpiece for the three elements disposed in front of the elements;

wherein the whistle body is of "mandolin" shape in side elevation, as defined herein, with the mouthpiece constituting the neck of the mandolin shape and the three whistle elements provided in the bulbous body of the mandolin shape.

Also in accordance with the invention there is provided a whistle of the type comprising at least three fipple-type whistle elements in a single whistle body, each whistle element having a chamber providing a respective vibratable air column and a respective vibration-producing edge at its entrance, at least two of the air columns being of different lengths, the whistle body being formed as a three-part plastic moulding consisting of:

a first moulding part providing upper or lower and side walls of a mouthpiece directing air to all the whistle elements, and the respective parts of the chambers of two of the whistle elements disposed side-by-side;

a second moulding part providing the remainders of the said two whistle element chambers, and at least a portion a third chamber; and a third moulding part providing the remainder of the mouthpiece passage, and the remainder of the third chamber.

Further in accordance with the invention there is provided a whistle of the type comprising a plurality of fipple-type whistle elements in a single whistle body, each whistle element having a chamber providing a respective vibratable air column and a respective vibration-producing edge at its entrance, at least two of the air columns being of different lengths, the whistle comprising:

at least two whistle elements disposed side-by-side to one another; and a common mouthpiece for all the elements disposed in front of the elements;

the whistle body having protruding from its rear end a boss of narrower width than the body for reception of a retaining means for the whistle, into which protruding boss one of the whistle element chambers extends.

DESCRIPTION OF THE DRAWINGS

A particular preferred embodiment of the invention will now be described, by way of example, with reference to the accompanying diagrammatic drawings, wherein:

FIGS. 3A, 3B and 3C are respective side elevations of the three moulding parts from which the whistle is assembled;

FIGS. 4A, 4B and 4C are respective plan elevations from above of the moulding parts;

DESCRIPTION OF THE PREFERRED EMBODIMENTS

Figure 1:
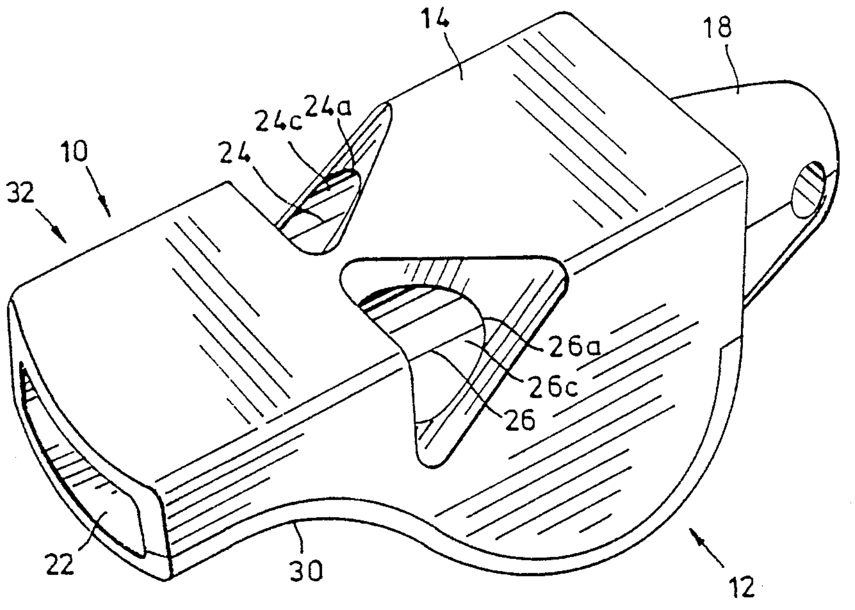
FIG. 1 is a perspective view of the whistle taken from above, to one side and somewhat to the front.
Figure 2:
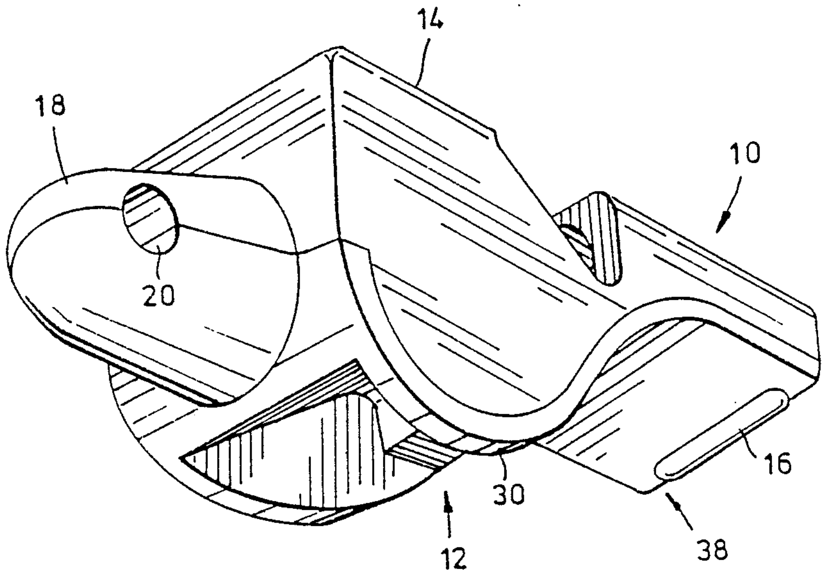
FIG. 2 is another perspective view taken from below, to one side and somewhat to the rear.
Figures 5A, 5B, 5C, 6A, 6B, 6C, 7A, 7B, 7C:
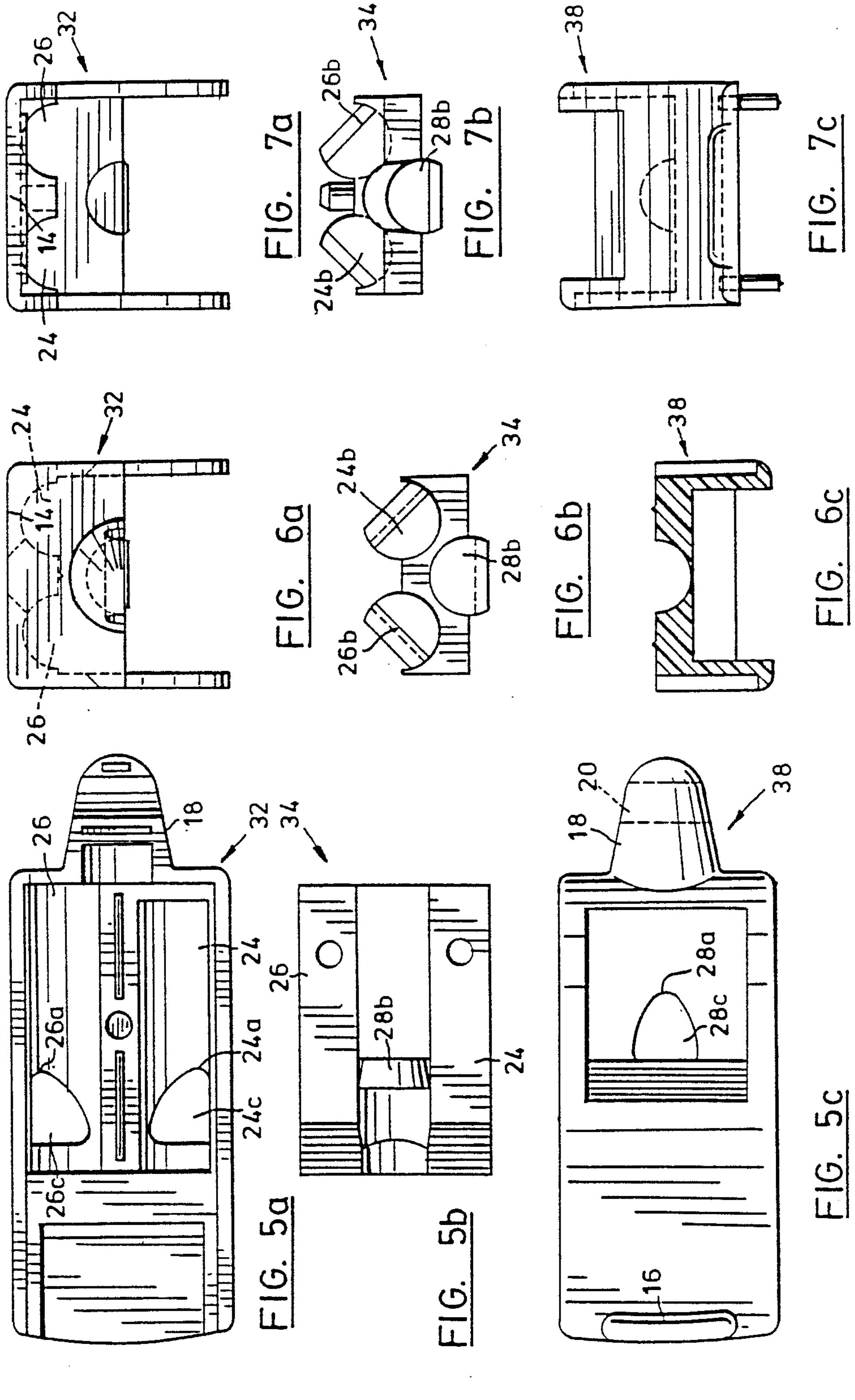
FIGS. 5A, 5B and 5C are respective plan elevations from below of the moulding parts.
FIGS. 6A, 6B and 6C are respective plan elevations from one end of the moulding parts.
FIGS. 7A, 7B and 7C are respective plan elevations from the other end of the moulding parts.

The specific preferred form of whistle has, as seen in side elevation, what is called for convenience in reference, a mandolin shape, having a narrow front portion 10, corresponding to the elongated neck of the mandolin shape, which constitutes the mouthpiece of the whistle, and a bulbous partially circular rear portion 12, corresponding to the body of the mandolin, which accommodates three fipple-type whistle elements, the common top face 14 of the front and rear portions being substantially flat. The lower surface of the open front end of the mouthpiece is provided with a downward protuberance 16 to facilitate gripping it between the lips and the teeth of the user and to help in its retention in the mouth. A boss 18 protrudes centrally from the rear end and is provided with a transverse bore 20 to receive a split ring used for attachment of a lanyard, chain, etc. to retain the whistle around the user's neck, or on the user's clothing, etc. The two side walls of the whistle body are substantially flat and parallel to one another. Such a whistle shape is thoroughly familiar to the principal user's thereof, particularly sports referees, the bulbous flat-sided body being easily and firmly gripped between the fingers. They are therefore thoroughly comfortable with its use, despite the need frequently to retain it in the mouth for considerable periods of time, and also to be constantly removing it from and replacing it in the mouth. The present invention solves the problem of providing three separate whistle elements all of different lengths in such a body shape, which was originally designed for a single chamber whistle employing a freely-moving ball.

The mouthpiece 10 provides a passage 22 leading to all three of the whistle elements, each of which has a respective chamber 24, 26 and 28, provided with respective vibration-producing knife edges or "splitters" **24*a*, 26*a* and 28*a*. Respective transverse walls 24*b*, 26*b* and 28*b* disposed in front of the knife edges form respective air-directing passages 24*c*, 26*c* and 28*c* that shape and direct the respective air flows through the passages against their respective knife edges. In this embodiment all three chambers are of circular cross-section with the two chambers 24 and 26 disposed in the upper part of the body parallel and close to one another, so that they are side-by-side as seen in plan, while the third chamber 28 extends into the cusp-shaped space between the other two; this brings the third chamber into line with the central boss 18 and permits it to protrude into the body of the boss, and thus be accommodated within the mandolin shapeside elevation profile. This arrangement also permits the wall 28*b* and its knife edge 28*a* to be located behind the other two walls 24*b* and 26*b* and the two knife edges 24*a* and 26*a*, which are side-by-side, and permits the retention of the smoothly curved lower wall 30 needed to obtain the desired traditional side profile. The arrangement also permits this particular disposition of the walls and knife edges, even though the chamber 28** is the longest of the three.

The high audibility of the whistle is due in substantial part to the complex beats and harmonics that are produced in and between the elements of different chamber lengths, and hence of different fundamental frequencies. At least two of the chambers should therefore be of different lengths to obtain this effect.

It is found that in this particular embodiment the specific lengths selected for the chambers are also important to obtain a compact whistle of high volume and audibility or penetration, and they should be between 2.0 cm (0.8 in.) and 2.5 cm (1.0 in.), preferably between 2.15 cm (0.86 in.) and 2.3 cm (0.92 in.). It is also found important for there not to be too great a difference between the longest and the shortest column, and this should be from 5 to 10%, preferably about 7%, of the length of the shortest chamber. A particular preferred structure has all three chambers of different lengths with the two shorter chambers of lengths 2.15 cm (0.86 in.) and 2.175 cm (0.87 in.), and the longer third chamber extending into the boss of length 2.30 cm (0.96 in.). The chambers are all of 0.682 cm (0.265 in.) diameter and are accommodated in a body of only 5.4 cm (2.16 in.) length, 2.0 cm (0.80 in.) width and 2.15 cm (0.806 in.) maximum depth, so that it is highly compact and easily held in the hand and the mouth.

For some persons it may be preferred to make the whistle so that the two side-by-side elements 24 and 26 are lowermost, while the third element is uppermost, in which case the mouthpiece protuberance 16 is provided on the other edge of the mouthpiece mouth and the bulbous body portion is also uppermost, while the common straight edge 14 becomes a lower edge. For convenience in nomenclature the resultant side elevation shape is still referred to as of "mandolin" shape.

The use of a protruding boss in this manner to provide a whistle of compact shape is also applicable to other whistle shapes, such as a bunch of three or more parallel whistle elements grouped together and blown through a common mouthpiece, the element with the longest chamber extending into the boss as described above for the preferred flat-topped mandolin shaped whistle.

A particular preferred manner of manufacturing this relatively complex structure is as a three-part plastic moulding. The first moulding part 32 is approximately U-shaped in transverse cross-section and provides the flat common top face 14 (or common bottom face if the shape is inverted) and the two spaced parallel side walls of the mouthpiece. These two side walls extend downwards providing the curved edges for the curved lower wall 30, and the corresponding part of the rounded bulb of the flat-topped mandolin shape. The top half only of the boss 18 protrudes from the rear face, and this also provides the corresponding top half portion of the rear end of the central lower chamber 28. The upper interior part of the moulding is shaped to provide the upper half portions of the two parallel chambers 24 and 26.

The second central or core moulding part 34 provides the remainder of the two chambers 24 and 26 and fits snugly between the walls of the first part, so that these two chambers are complete when the two parts are together. The part also has two upwardly protruding air-directing wall members 24*b*, 26*b* and a downwardly protruding wall member 28*b*. It further provides the upper front portion of the third chamber 28 between the two parallel remainder chamber parts.

The third moulding part 38 also fits snugly between the walls of the first part with the second core moulding part enclosed between the other two moulding parts. This third part carries the mouth protuberance 16 and provides the bottom wall needed to complete the mouthpiece passage 22. It further provides the smoothly curved lower wall 30, the knife edge 28*a* for the column 28 and the lower part of the boss 18, which is hollow to complete the column 28, as well as completing the boss itself. A similar structure will still be employed if the inverted shape described above is preferred.

It will be seen that the three parts can readily be moulded separately to the tolerances required for the middle and third parts to fit snugly within the upper part, without the need for complex multi-part moulds, and upon assembly of the three parts together the whistle is complete. The split ring that usually is provided in the transverse bore can be placed in position before the parts are connected together, avoiding the tedious and difficult addition step that is otherwise required. The parts can be retained together by any suitable means, such as ultrasonic welding or cementing and requires only the addition of a lanyard or chain, etc. The cluster of whistles of different intrinsic pitches, owing to the different but close lengths of the respective columns (i.e. within 7% of one another), produce an exceptionally loud and piercing noise without requiring more than moderate blowing by the user, but is unexpectedly difficult, if not impossible, to "over-blow" unless a quite excessive blowing force is used.

We claim:

1. A whistle of the type comprising at least three fipple-type whistle elements in a single whistle body, each whistle element having a chamber providing a respective vibratable air column and a respective vibration-producing edge at its entrance, at least two of the air columns being of different lengths, the whistle comprising:

- first and second whistle elements disposed side-by-side as seen in plan with the third whistle element disposed between the other two elements, the third whistle element being displaced laterally from the first and second elements as seen in side elevation; and
- a common mouthpiece for the three elements disposed in front of the elements;
- wherein the whistle body is of "mandolin" shape in side elevation, as defined herein, with the mouthpiece constituting the neck of the mandolin shape and the three whistle elements provided in the bulbous body of the mandolin shape.

2. A whistle as claimed in claim 1, wherein the third element has the longest chamber of the three elements.

3. A whistle as claimed in claim 2, wherein the whistle body has a boss protruding from its rear end and the said third element column extends into the said boss.

4. A whistle as claimed in any one of claims 1 to 3, wherein the first and second whistle elements are upper elements as seen in side elevation and the third whistle element is a lower element.

5. A whistle as claimed in claim 3, wherein the boss is pierced for reception of a retaining means for the whistle.

6. A whistle as claimed in claim 2, wherein the entrance wall and vibration-producing edge of the third element are disposed further back in the body than the entrance walls and edges of the other two elements.

7. A whistle as claimed in any one of claims 1 to 3, wherein the side of the bulbous body are parallel and substantially flat to facilitate gripping between the fingers of the user.

8. A whistle as claimed in any one of claims 1 to 3, wherein the chambers of the elements are all of circular transverse cross-section and the third chamber is disposed in the body in the cusp-shaped space between the first and second elements.

9. A whistle as claimed in any one of claims 1 to 3, wherein the differences between the longest and the shortest chamber is about 5% to 10% of the length of the shortest chamber.

10. A whistle as claimed in any one of claims 1 to 3, wherein the lengths of the chambers are between 2.0 cm (0.8 in.) and 2.5 cm (1 in.).

11. A whistle as claimed in any one of claims 1 to 3, wherein the lengths of the chambers are between 2.15 cm (0.86 in.) and 2.3 cm (0.92 in.).

12. A whistle as claimed in any one of claims 1 to 3, wherein the lengths of the three chambers are respectively 2.15 cm (0.86 in.), 2.175 cm (0.870 in.) and 2.3 cm (0.92 in.).

13. A whistle as claimed in any one of claims 1 to 3, wherein the whistle body is formed as a three-part plastic moulding consisting of:

- a first moulding part providing a wall or walls of the mouthpiece and the respective parts of the first and second chambers;
- a second moulding part providing the remainders of the first and second chambers, and at least the major portion of the length of the respective part of the third chamber; and
- a third moulding part providing the remainder of the walls mouthpiece passage, and the remainder of the third chamber.

14. A whistle as claimed in any one of claims 1 to 3, wherein the whistle body is formed as a three-part plastic moulding consisting of:

- a first moulding part having a top or bottom wall and two spaced parallel side walls constituting respectively the upper or lower wall and side walls of the mouthpiece and the whistle body, and the respective parts of the first and second chambers;
- a second moulding part providing the remainders of the first and second chambers, the transverse walls for the air-directing passages and at least the major portion of the length of the respective part of the third chamber; and
- a third moulding part providing the remainder of the mouthpiece passage walls, and the remainder of the third chamber;
- the middle and third moulding parts fitting between the said side walls of the first moulding part.

15. A whistle as claimed in any one of claims 1 to 3, wherein the whistle body is formed as a three-part plastic moulding consisting of:

a first moulding part providing top or bottom and side walls of the mouthpiece and of the whistle body, and the respective parts of the first and second chambers, the first moulding part also providing the respective part of a boss protruding from the rear end of the whistle, which boss includes the respective rear end portion of the third chamber;

a second moulding part providing the remainders of the first and second chambers, the transverse walls for the air-directing passages, and at least the major portion of the length of the respective part of the third chamber; and a third moulding part providing the remainder of the mouthpiece passage, the remainder of the third chamber, and the remainder of the boss.

16. A whistle of the type comprising at least three fipple-type whistle elements in a single whistle body, each whistle element having a chamber providing a respective vibratable air column and a respective vibration-producing edge, at least two of the air columns being of different lengths, the whistle body being formed as a three-part plastic moulding consisting of:

a first moulding part providing a wall or walls of a mouthpiece directing air to all the whistle elements, side walls of the whistle body, and the respective parts of the chambers of two of the whistle elements disposed side-by-side;

a second moulding part providing the remainders of the said two whistle element chambers, and at least a portion of a third chamber; and a third moulding part providing the remainder of the mouthpiece passage walls, and the remainder of the third chamber.

17. A whistle as claimed in claim 16, wherein the first moulding part has a top or bottom wall and two spaced parallel side walls and the second and third moulding parts fit between the said side walls of the first moulding part.

18. A whistle as claimed in claim 16, wherein the whistle body has a boss protruding from its rear end and the said third element column extends into the said boss, the boss being formed between the first and third moulding elements.

19. A whistle as claimed in any one of claims 16 to 18, wherein the second moulding part provides the transverse walls for the air-directing passages of the columns.

20. A whistle as claimed in claim 18, wherein the boss is pierced for reception of a retaining means for the whistle.

21. A whistle as claimed in any one of claims 16 to 18, wherein the third element has the longest chamber of the three elements.

22. A whistle as claimed in any one of claims 16 to 18, wherein the sides of the whistle body are parallel and substantially flat to facilitate gripping between the fingers of the user.

23. A whistle as claimed in any one of claims 16 to 18, wherein the chambers of the elements are all of transverse circular cross-section and the third chamber is disposed in the body in the cusp-shaped space between the first and second elements.

24. A whistle as claimed in any one of claims 16 to 18, wherein the differences between the longest and the shortest chamber is about 5% to 10% of the length of the shortest chamber.

25. A whistle as claimed in any one of claims 16 to 18, wherein the lengths of the chambers are between 2.0 cm (0.8 in.) and 2.5 cm (1 in.).

26. A whistle as claimed in any one of claims 16 to 18, wherein the lengths of the chambers are between 2.15 cm (0.86 in.) and 2.3 cm (0.92 in.).

27. A whistle as claimed in any one of claims 16 to 18, wherein the first and second whistle elements are upper elements as seen in side elevation and the third whistle element is a lower element.

28. A whistle of the type comprising a plurality of fipple-type whistle elements in a single whistle body, each whistle element having a chamber providing a respective vibratable air column and a respective vibration-producing edge at its entrance, at least two of the air columns being of different lengths, the whistle comprising:

at least two whistle elements disposed side-by-side to one another; and a common mouthpiece for all the elements disposed in front of the elements;

the whistle body having protruding from its rear end a boss of narrower width and height than the body for reception of a retaining means for the whistle, into which protruding boss one of the whistle element chambers extends.

29. A whistle as claimed in claim 28, wherein the element that protrudes into the boss has the longest chamber of all of the elements.

30. A whistle as claimed in claim 28 or 29, and including three whistle elements, wherein all of the chambers are of circular transverse cross-section and one chamber is disposed in the whistle body in the cusp-shaped space between the other two chambers.

31. A whistle as claimed in claim 28 or 29, wherein the differences between the longest and the shortest chamber is about 5% to 10% of the length of the shortest chamber.

32. A whistle as claimed in claim 28 or 29, wherein the lengths of the chambers are between 2.0 cm (0.8 in.) and 2.5 cm (1 in.).

33. A whistle as claimed in claim 28 or 29, wherein the lengths of the chambers are between 2.15 cm (0.86 in.) and 2.3 cm (0.92 in.).

34. A whistle as claimed in claim 28 or 29, wherein the lengths of the three chambers are respectively 2.15 cm (0.86 in.), 2.175 cm (0.870 in.) and 2.3 cm (0.92 in.).

35. A whistle as claimed in claim 28 or 29, wherein the whistle body is formed as a three-part plastic moulding consisting of:

a first moulding part providing a wall or walls of the mouthpiece and body, respective parts of two whistle element chambers, and an upper or lower part of the boss;

a second moulding part providing the remainders of the said two chambers, and at least the major portion of the respective part of a third chamber; and a third moulding part providing the remainder of the walls of the mouthpiece passage, the remainder of the third chamber, and the remainder of the boss;

the middle and third moulding parts fitting between the said side walls of the third moulding part.

36. A whistle as claimed in claim 28 or 29, wherein the whistle body is formed as a three-part plastic moulding consisting of:

a first moulding part providing a wall or walls of the mouthpiece and body, respective parts of two whistle element chambers, and an upper or lower part of the boss;

a second moulding part providing the remainders of the said two chambers, the transverse walls for the air-directing passages of the three columns, and at least the major portion of the respective part of a third chamber; and a third moulding part providing the remainder of the walls of the mouthpiece passage, the remainder of the third chamber, and the remainder of the boss;

the middle and third moulding parts fitting between the said side walls of the third moulding part.

* * * * *